United States Patent
Zimmermann

(10) Patent No.: US 6,811,524 B2
(45) Date of Patent: Nov. 2, 2004

(54) ELASTIC ROLL, PROCESS FOR PRODUCING SUCH A ROLL, AND PROCESS OF REPAIRING THE ROLL

(75) Inventor: Lothar Zimmermann, Krefeld (DE)

(73) Assignee: Voith Paper Patent GmbH, Heidenheim (DE)

(*) Notice: Subject to any disclaimer, the term of this patent is extended or adjusted under 35 U.S.C. 154(b) by 0 days.

(21) Appl. No.: 09/759,171

(22) Filed: Jan. 16, 2001

(65) Prior Publication Data

US 2001/0016547 A1 Aug. 23, 2001

(30) Foreign Application Priority Data

Jan. 14, 2000 (DE) .......................... 100 01 409

(51) Int. Cl.⁷ .............................. F16C 13/00; B23P 6/00
(52) U.S. Cl. .............................. 492/50; 492/56; 492/59; 29/895.1; 29/895.32; 29/402.09; 29/402.21
(58) Field of Search .............................. 492/59, 50, 48, 492/53, 56; 29/402.21, 402.01, 402.09, 895.32, 895.1, 895.21, 895.211, 895.23

(56) References Cited

U.S. PATENT DOCUMENTS

| | | | | |
|---|---|---|---|---|
| 2,534,818 A | * | 12/1950 | Holroyd et al. ............. | 442/137 |
| 3,811,164 A | * | 5/1974 | Faress et al. ................. | 492/48 |
| 4,173,058 A | * | 11/1979 | Stieger ....................... | 29/895.32 |
| 4,368,568 A | | 1/1983 | Watanabe | |
| 5,112,924 A | * | 5/1992 | Chu et al. ................... | 428/408 |
| 5,258,426 A | * | 11/1993 | Uchida et al. .............. | 428/413 |
| 5,514,466 A | * | 5/1996 | Yamada et al. ............. | 428/326 |
| 5,709,748 A | * | 1/1998 | Sassa et al. ................. | 118/262 |
| 5,733,235 A | | 3/1998 | Waku et al. | |
| 6,059,095 A | * | 5/2000 | Tsuji ........................... | 492/38 |
| 6,077,207 A | * | 6/2000 | Yokoyama et al. .......... | 492/30 |
| 6,105,249 A | * | 8/2000 | Ando et al. .................. | 429/59 |
| 6,308,623 B1 | * | 10/2001 | Schonberger et al. ........ | 492/30 |
| 6,409,645 B1 | * | 6/2002 | Paasonen et al. ............. | 492/56 |
| 6,493,938 B1 | | 12/2002 | Vainio et al. | |

FOREIGN PATENT DOCUMENTS

| | | |
|---|---|---|
| DE | 1807331 | 6/1968 |
| DE | 1621821 | 10/1971 |
| DE | 2128294 | 1/1973 |
| DE | 2330565 | 1/1974 |
| DE | 3703564 | 8/1987 |
| DE | 4339097 | 11/1994 |
| DE | 19543555 | 5/1996 |
| DE | 69314966 | 3/1998 |
| DE | 19736575 | 3/1999 |
| DE | 29880097 | 9/1999 |
| EP | WO 98/54405 | * 12/1998 |
| WO | 94/09208 | 4/1994 |

* cited by examiner

*Primary Examiner*—Marc Jimenez
(74) *Attorney, Agent, or Firm*—Greenblum & Bernstein, P.L.C.

(57) ABSTRACT

A roll for smoothing a web, a process for making the roll and a process of repairing the roll. The roll includes a roll core having an outer surface. A covering layer is disposed on the outer surface of the roll core. The covering layer has an inner surface and an outer surface. The covering layer includes an elastic matrix material. The elastic matrix material includes a mixture of at least one thermosetting plastic and at least one thermoplastic. The process of making includes providing a roll core having an outer surface, forming an elastic covering layer including at least one thermosetting plastic and at least one thermoplastic, and applying the covering layer to the outer surface of the roll core. The process of repairing includes heating an elastic covering layer made from an elastic matrix material which comprises at least one thermosetting plastic and at least one thermoplastic, and allowing any markings in a surface of the covering layer to be filled.

59 Claims, 1 Drawing Sheet

ELASTIC ROLL, PROCESS FOR PRODUCING SUCH A ROLL, AND PROCESS OF REPAIRING THE ROLL

CROSS-REFERENCE TO RELATED APPLICATIONS

The present application claims priority under 35 U.S.C. § 119 of German Patent Application No. 100 01 409.7, filed on Jan. 14, 2000, the disclosure of which is expressly incorporated by reference herein in its entirety.

BACKGROUND OF THE INVENTION

1. Field of the Invention

The present invention relates to a roll of the type used for smoothing paper webs. The roll has a hard roll core which can be a metal and an outside surface utilizing an elastic covering layer comprising an elastic matrix material. Furthermore, the invention is directed to a process for producing such a roll.

2. Discussion of Background Information

The present invention relates to rolls which may be used for the smoothing of paper webs. Such rolls typically have a hard roll core consisting of metal and being provided on the outside with an elastic covering layer comprising an elastic matrix material.

Elastic rolls of this kind are used, for example, in the satining of paper webs. In such cases, one elastic roll is arranged together with a hard roll in order to form a press gap or press nip through which the paper web to be treated is guided. The hard roll typically has a very smooth surface by virtue of it consisting, for example, of steel or chilled cast iron and this metal roll is responsible for the smoothing of the side of the paper web facing it. However, the elastic roll acting on the opposite side of the paper web effects a homogenizing and compacting of the paper web in the nip.

The order of magnitude of such rolls range from approximate lengths of 3 to 12 m and approximate diameters from 450 to 1500 mm. They can typically withstand line forces of up to approximately 600 N/mm and compressive stresses of up to approximately 130 N/mm$^2$.

A known problem with conventional elastic rolls relates to their susceptibility of so-called markings; these markings are impressions which occur or are formed on the outside of the covering layer. Such markings can arise, for example, when foreign bodies or folds in the paper web create indentations in the elastic roll cover, e.g., these are typically created when the web passes through the press nip with such folds or foreign bodies. Often, these markings are permanently formed in the surface of the covering layer so that they are transferred to the surface of the paper web which is guided through the nip. As a result, a paper web which runs through such a marked up nip may have a lower quality. Thus, it may be necessary to remove the markings in the roll covers, in order to improve the quality of the paper web.

In addition to these quality related problems, markings can also result in the destruction of the roll covering the layer itself. As the trend in paper manufacturing is towards performing the satining in an online operation, i.e. towards guiding the paper web exiting a paper machine or coating machine directly through the paper smoothing apparatus (e.g., a calender), correspondingly high transportation speeds of the paper web and high rotation speeds of the calender rolls associated therewith are typically required. As a result of these high web transportation speeds, the nip frequency, that is the frequency with which the covering is compressed and relieved of its load again, is increased. This, in turn, can lead to increased roll temperatures. Such increased temperatures can give rise to so-called hot spots which lead to peeling or even chipping of the covering layer. Moreover, the existence of very distinct markings in conjunction with the increased roll temperatures can aggravate and/or accelerate the problem of peeling or chipping.

Thermosetting plastics are nowadays usually used as the base material for the covering layer of elastic rolls. Thermosetting plastics have the advantage that they have a high elasticity up to their respective glass transition temperature Tg and are therefore well suited for the formation of the elastic covering layer. However, thermosetting plastics have the property that they can only be exposed to temperatures below the Tg value after a one-time heating into the range of the Tg temperature value and a subsequent hardening, since they are destroyed at temperatures above the Tg value after hardening.

Elastic rolls having a covering layer based on pure thermosetting plastics thus have the disadvantage that the covering layer is destroyed if its temperature is raised above the Tg value. Markings in the surface of the covering layer can only be removed from such rolls by, e.g., abrading the whole covering layer surface. The abrading of elastic rolls is, however, a very time-consuming mechanical process which requires special machines. Such processes therefore result in relatively long down times of a corresponding paper smoothing apparatus.

SUMMARY OF THE INVENTION

The present invention therefore provides an elastic roll in which markings in the surface of the covering layer can be repaired relatively easily. Accordingly, the roll may be repaired in a simple manner by heating the roll cover. Moreover, temperature increases into the range of the glass transition temperature of the matrix material should not result in the destruction of the cover layer. The invention also provides for a method for the manufacture and repair of such a roll.

The invention therefore provides for an elastic roll which is made of an elastic matrix material comprising a mixture of at least one thermosetting plastic and at least one thermoplastic. A method of making the roll is also provided in which the at least one thermosetting plastic and at least one thermoplastic are mixed with one another to form the elastic covering layer and the resulting mixture is applied to a roll core. Finally, the invention provides a method of repairing the roll, which is made of a mixture of at least one thermosetting plastic and at least one thermoplastic, by heating the roll until the surface is free of any surface markings. The roll may also be rotated in addition to being heated and thereafter smoothed.

In accordance with the invention, the advantages of the known thermosetting plastics, in particular their high elasticity, are thus combined with the advantage of thermoplastics, namely a repeatable melting capability. Thus, markings in a covering layer which are typically formed in the calendering process can be removed without resort to mechanical abrading. Accordingly, the markings can be removed by using a simple heating process, i.e., heating the matrix material above the melting temperature of the thermoplastic. An adequate surface quality of the repaired covering layer can also be achieved without additional rework, e.g., in particular when the roll is set into rotation during the heating process. In order to repair deeper markings, the surface of the cover may be subjected to a smoothing treatment which can be carried out, e.g., simultaneously during or after the heating.

According to one advantageous embodiment of the invention, the proportion of thermosetting plastic is made higher than the proportion of thermoplastic and is advantageously between approximately 50% and 80%, and may be in particular between approximately 60% and 75%, and preferably amounts to approximately 70%. In order to ensure that the elasticity of the covering layer is sufficiently high, the mixing ratio may be influenced, e.g., taking advantage of the fact that the thermosetting plastics usually have a higher elasticity than thermoplastics.

According to another embodiment of the invention, the mixture contains different thermosetting plastics and/or different thermoplastics. In this way, the desired physical properties of the covering layer can be set and/or influenced, e.g., by using different basic materials. For example, the overall heat transmission temperature of the thermosetting plastics can be set and/or controlled by mixing different thermosetting plastics, while the overall melting temperature of the thermoplastics can be set and/or controlled by mixing different thermoplastics.

The mixing ratio of thermosetting plastics and thermoplastics may advantageously be essentially constant over the axial length of the covering layer. Such a design can ensure that the physical properties of the covering layer, such as elasticity, temperature resistance and melting point, are uniform in an axial direction. In this way, the paper web to be treated will also have a uniform quality over its total width.

The mixing ratio of thermosetting plastic and thermoplastic over the radial thickness of the covering layer may be essentially constant; however, it is also possible to vary the mixing ratio of thermosetting plastic and thermoplastic over the radial thickness of the covering layer. In this way, the elasticity of the covering layer in the radial direction can, for example, be adapted as desired in this way.

In accordance with another embodiment, the proportion of thermosetting plastic may increase radially outwardly, since the markings which occur at the surface of the covering layer can be removed particularly efficiently in this way when the covering layer is heated.

In accordance with another embodiment of the invention, fibers, e.g., one or more fiber layers, may be embedded in the matrix material of the covering layer. These fibers may be, for example, glass and/or carbon and/or aramide fibers.

On the one hand, a reinforcement of the matrix material is achieved by the addition of the fibers and, on the other hand, the thermal conductivity of the covering layer can be increased and/or influenced by the selection of corresponding fiber materials. Thus, the invention provides for a roll cover in which unwanted heat occurring at hot spots inside the covering layer may be carried off quickly depending on the arrangement of the fibers in the covering layer, e.g., outwardly and/or side-wise in the direction of the covering layer surface or in the direction of the roll core.

Additional fillers, for example in powder form, can be included in the matrix material in a corresponding manner so that the physical properties of the covering layer, such as thermal conductivity, thermal expansion coefficient or other desired properties, can also be set and/or controlled. The roll cover may also include various combinations of different fillers and different fibers which may be useful in influencing such physical properties.

In accordance with still another embodiment of the invention, the melting temperature of the thermoplastics is selected to be below the glass transition temperature of the thermosetting plastic or plastics. It is even possible to raise the covering layer above the melting temperature of the thermoplastic or thermoplastic mixture by the selection of corresponding thermoplastics and thermosetting plastics or corresponding thermoplastic and thermosetting plastic mixtures and thus to achieve the melting or part melting of the covering layer required for the removal without the thermosetting plastic proportion of the covering layer being destroyed by overheating.

The invention thus provides that at least one thermosetting plastic and at least one thermoplastic are mixed together to form the elastic covering layer for the generation of an elastic roll in accordance with the invention, with the resulting mixture then being applied to the roll core. A plurality of fillers and/or fibers, in particular in the form of one or more fiber bundles and/or fiber rovings and/or fiber fleeces, can be impregnated with the mixture, e.g., drawn through a matrix bath consisting of the mixture, whereupon the impregnated fibers are wound onto the roll core.

It is, however, also possible for the fibers to be wound onto the roll core in a substantially dry state and thereafter covered with and/or encapsulated with matrix material. Alternatively, the fibers can be loaded with the mixture during winding and/or after the cover is wound onto the roll core, e.g., with the fibers being completely embedded in the mixture.

Another manufacturing possibility provides for the cylinder jacket-like covering layer to be formed separately from the roll core. Such a covering layer may be made by, e.g., injection molding, winding onto a winding core, casting, extrusion or another manufacturing process. Afterwards, the covering layer can be applied to the roll core in any number of ways, e.g., being pushed onto it. Additionally, in order to achieve a firm seating on the roll core, the covering layer can be affixed and/or fastened to the roll core using any number of methods, e.g.,shrink fitting, connecting adhesives, fasteners, or other known fixing, connecting, bonding or attaching mechanisms.

The invention also contemplates manufacturing the covering layer first only from thermosetting plastic, which may or may not also include various fillers and/or fibers, and subsequently incorporate the thermoplastic into and/or onto the semi-finished covering layer.

It is also possible, in principle, for the mixing of the thermosetting plastic and the thermoplastic to be carried out by a physical, for example a mechanical, mixing procedure, such as a stirring procedure, or by a chemical mixing process, for example copolymerization, or by both mixing procedures. The term physical mixing procedure is here understood to mean a mixing procedure in which the structure of the thermosetting plastic and the thermoplastic does not undergo any change at the molecular level. A chemical mixing process, on the other hand, represents a mixture at the molecular level and results in a change in the molecular structure of the starting materials.

According to one aspect of the invention, there is provided a roll for smoothing a web comprising a roll core having an outer surface, a covering layer disposed on the outer surface of the roll core, the covering layer having an inner surface and an outer surface, the covering layer comprising at least one thermosetting plastic and at least one thermoplastic. The web may be a paper web. The roll core may comprise a hard metal roll core. The covering layer may comprise a matrix material and one of fillers and fibers may be embedded in the matrix material. The amount of thermosetting plastic may be, one of greater than and proportionally greater than, the amount of thermoplastic. The proportion of thermosetting plastic may be between approximately 50% and 80%. The proportion may be between approximately 60% and 75%. The proportion may also be approximately 70%.

The covering layer may include at least two different thermosetting plastics. The covering layer may comprise a mixture of the at least one thermosetting plastic and the at least one thermoplastic and wherein an amount of the thermosetting plastic relative to the amount of thermoplastic in the covering layer comprises a mixture ratio which is essentially constant over an axial length or a radial thickness of the covering layer. The covering layer may comprise a mixture of the at least one thermosetting plastic and the at least one thermoplastic and wherein an amount of the thermosetting plastic relative to the amount of thermoplastic in the mixture comprises a mixture ratio which varies over a radial thickness of the covering layer. The amount or proportion of thermoplastic relative to the amount of the thermosetting plastic may increase radially outwardly in the covering layer.

The covering layer may include one of fillers and fibers. The covering layer may comprise a matrix material and wherein the fillers or fibers are disposed in the matrix material of the covering layer. The covering layer may include fibers arranged in the form of one or more fiber layers. The covering layer may include one of glass, carbon, and aramide fibers.

The fibers and fillers may be encapsulated by the covering layer made of matrix material. The covering layer may include powdered fillers.

The at least one thermoplastic may have a melting temperature which is below a glass transition temperature of the at least one thermosetting plastic.

According to another aspect of the invention, there is provided a process for making a roll for smoothing a web comprising providing a roll core having an outer surface, forming an elastic covering layer including at least one thermosetting plastic and at least one thermoplastic, and applying the covering layer to the outer surface of the roll core. The forming may comprise mixing the at least one thermosetting plastic and at least one thermoplastic to form an elastic matrix material. The covering layer may comprise one of fibers and fillers. The covering layer may comprise fibers which are arranged in the form of one of fiber bundles, fiber rovings, and fiber fleeces.

The forming may comprise mixing the at least one thermosetting plastic and at least one thermoplastic to form an elastic matrix material, and placing fibers one of into and adjacent to the elastic matrix material. The forming may comprise mixing the at least one thermosetting plastic and at least one thermoplastic to form an elastic matrix material and wherein the applying comprises drawing fibers through a matrix bath comprising the elastic matrix material and winding the fibers.

The covering layer may be formed with the fibers being wound onto a tool and thereafter the covering layer is applied to the roll core. The covering layer may be formed with the fibers being wound onto to the roll core.

The forming may comprise mixing the at least one thermosetting plastic and at least one thermoplastic to form an elastic matrix material and wherein the applying comprises winding fibers in a substantially dry state and thereafter coating the fibers with the elastic matrix material.

The covering layer may be formed with the fibers being wound onto a tool and thereafter the covering layer is applied to the roll core. The covering layer may be formed with the fibers being wound onto to the roll core. The wound fibers may comprise one of fiber bundles, fiber rovings, and fiber fleeces.

The coating may completely encapsulate the fibers. The coating may occur one of during and after the fibers are wound.

The at least one thermosetting plastic and the at least one thermoplastic may be mixed together by one of a physical and a mechanical mixing procedure. The at least one thermosetting plastic and the at least one thermoplastic may be mixed together by one of a chemical mixing process and a copolymerization.

The invention also provides for a process of repairing a roll for smoothing a web comprising heating an elastic covering layer made from an elastic matrix material which comprises at least one thermosetting plastic and at least one thermoplastic; and allowing any markings in a surface of the covering layer to be filled.

The allowing may comprise filling the markings with a material which is comparable to the matrix material. The allowing may comprise allowing the markings to be filled with heated matrix material from the covering layer. The process may further comprise rotating the elastic covering layer one of during and after the heating.

The process may further comprise removing the covering layer from a roll core prior to heating and thereafter placing the covering layer onto the role core. The heating comprises heating the covering layer while it remains installed on a roll core. The process may further comprise one of smoothing and polishing a surface of the covering layer one of during or after the heating.

The invention also contemplates a roll for smoothing a web comprising a roll core having an outer surface, a covering layer disposed on the outer surface of the roll core, the covering layer having an inner surface and an outer surface, the covering layer comprising an elastic matrix material, the elastic matrix material comprising a mixture of at least one thermosetting plastic and at least one thermoplastic, and the covering layer including one of fibers and fillers, wherein the at least one thermoplastic has a melting temperature which is below a glass transition temperature of the at least one thermosetting plastic.

The invention further contemplates a process for making a roll for smoothing a web comprising providing a roll core having an outer surface, forming an elastic covering layer by mixing at least one thermosetting plastic and at least one thermoplastic to form an elastic matrix material, placing fibers one of into and adjacent to the elastic matrix material, and applying the covering layer to the outer surface of the roll core, wherein the at least one thermoplastic has a melting temperature which is below a glass transition temperature of the at least one thermosetting plastic.

According to another aspect of the invention, there is provided a process of repairing a roll for smoothing a web comprising heating an elastic covering layer made from an elastic matrix material which comprises at least one thermosetting plastic and at least one thermoplastic, the at least one thermoplastic having a melting temperature which is below a glass transition temperature of the at least one thermosetting plastic, wherein the covering layer is heated above the melting temperature of the at least one thermoplastic and below the glass transition temperature of the at least one thermosetting plastic. The process may further comprise rotating the elastic covering layer one of during and after the heating. The process may further comprise smoothing or polishing a surface of the covering layer one of during and after the heating.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
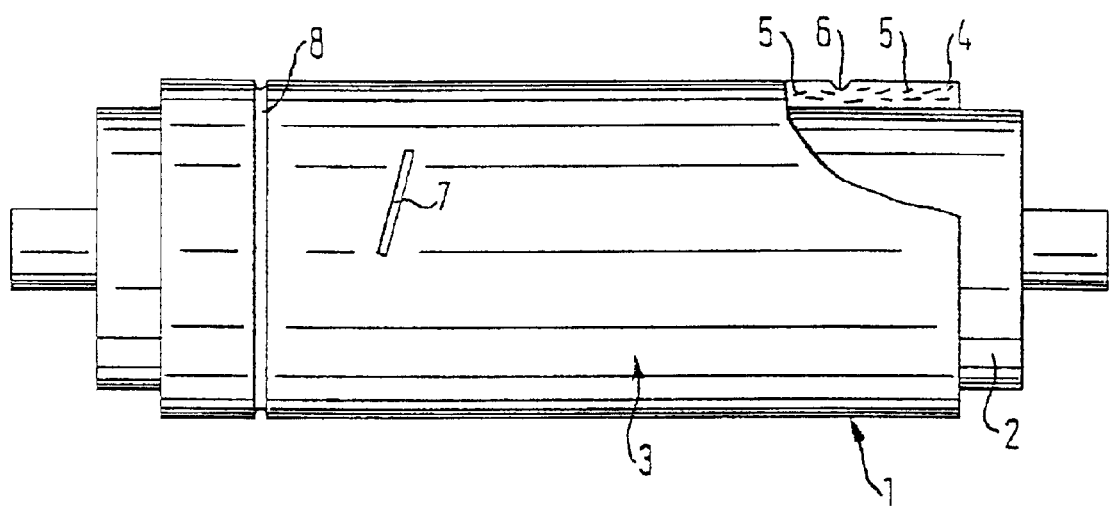
FIG. 1 a schematic, partly cut-away side view of a roll formed in accordance with the invention.

FIG. 1 shows a roll 1 which includes a roll core 2 made of, e.g., steel or chilled cast iron. An elastic covering layer 3 is provided on the outside of roll core 2.

It can be seen from the schematically cut-away view in the upper half of FIG. 1 that elastic covering layer 3 comprises an elastic matrix material 4 and fillers 5, which may be, for example, fibers, powdered fillers or the like, which are embedded therein.

Matrix material 4 is formed as a mixture of at least one thermoplastic and at least one thermosetting plastic and preferably more than one thermoplastic and thermosetting plastic. The proportion of thermosetting plastics in the mixture is preferably greater than the proportion of thermoplastics. Fillers 5, formed for example as fibers, can be arranged to form fiber layers which, for the formation of the roll, are impregnated in each case with matrix material 4 and wound onto the roll core 2. The winding may be in the form of, e.g., diagonal windings. Moreover, the winding angles of the single winding layers can be alternated with one other in such a way that the individual fiber layers are wound as a cross composite with respect to one another.

Covering layer 3 can be applied directly to roll core 2; however, it is also possible for a connecting layer to be formed between covering layer 3 and roll core 2, in order to achieve better adhesion of covering layer 3 on roll core 2. Furthermore, the distribution and the kind of fillers 5 within elastic covering layer 3 can also change and/or vary over its radial extension such that the radially outwardly located region of covering layer 3 has different physical properties, e.g., higher elasticity, than the radially inwardly located region of covering layer 3.

FIG. 1 shows three markings 6, 7, 8 in the form of recesses in the surface of elastic covering layer 3. Markings 6, 7, 8 can, for example, be caused by foreign bodies entering into the nip between the roll 1 and, for example, a hard counter roll. Such markings 6, 7, 8 can also be caused by folds in the paper web running into the nip. Markings, like the marking 7 for example, can extend only over a region of elastic covering layer 3 or, like marking 8, over the whole periphery of elastic covering layer 3.

Figure 2:
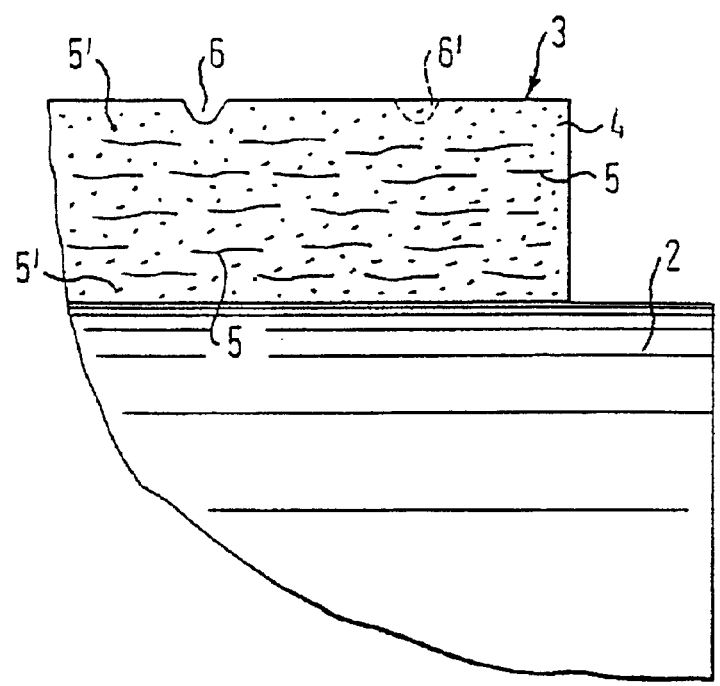
FIG. 2 the cut-away part of the roll in accordance with FIG. 1 in an enlarged representation.

In the sectional enlargement shown in FIG. 2, marking 6 can be seen more clearly as a notch and/or depression in the surface of elastic covering layer 3. Furthermore, both fibrous fillers 5 and powdered fillers 5' are shown in the matrix material by which the respective desired physical properties of covering layer 3 is set and/or controlled. As a result, the stiffness, thermal conductivity, thermal expansion coefficient and the like of covering layer can be known and/or adapted to the requirements of the paper web.

While in the case of a covering layer which consists solely of a thermosetting plastic with possibly embedded fillers, such a marking can only be removed by abrading the whole surface of the covering layer, it is possible with a roll in accordance with the invention having elastic covering layer 3, which includes at least one thermosetting plastic and one thermoplastic, to eliminate markings, e.g., marking 6 by heating covering layer 3 above the melting point of matrix material 4.

In this way, the mixture which includes the thermoplastic and the thermosetting plastic becomes so liquid by this heating that the liquid matrix material 4 flows into the recess forming the marking. This procedure is particularly enhanced when roll 1 is rotated during the heating. This compensation process is further increased by the centrifugal force which is created due to the rotation.

With sufficient heating, marking 6 becomes completely filled with matrix material 4, as is illustrated by way of a marking 6' shown by a dotted line. Covering layer 3 can thus again achieve a completely smooth surface without resort to mechanical finishing such as abrading of covering layer 3.

However, in order to achieve an even better smoothness of the surface of covering layer 3, the surface can additionally be smoothed and/or polished in a smoothing process in the region of the again filled marking 6'. This polishing or smoothing can be carried out during the heating process or after the cooling of the surface of covering layer 3.

Generally, it is also possible to fill in markings 6, 7, 8 with melted matrix material filler. In this case, matrix material 4 should be in the heated, i.e., partly melted or melted state in the region of marking 6, and thereafter filled with melted matrix material of the same kind. The matrix material should closely combine with matrix material 4 of covering layer 3, due to the liquid or almost liquid state of aggregation of the two materials. An additional smoothing and/or polishing process of the surface of the repaired covering layer 3 can also additionally be carried out here either in the hot state or after cooling.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

Reference Numeral List 1 roll
2 roll core
3 elastic covering layer
4 matrix material
5,5' fillers
6 marking
6' repaired marking
7 marking
8 marking

What is claimed is:

1. A roll for smoothing a web comprising:
   a roll core having an outer surface;
   a covering layer disposed on the outer surface of the roll core, the covering layer having an inner surface and an outer surface;
   the covering layer comprising at least one thermosetting plastic and at least one thermoplastic,
   wherein the at least one thermoplastic has a melting temperature which is below a glass transition temperature of the at least one thermosetting plastic,
   wherein the covering layer contains no through-apertures and has a smooth outer surface, and
   wherein the roll is a smoothing paper web roll.

2. The roll of claim 1, wherein the web is a paper web.

3. The roll of claim 1, wherein the roll core comprises a hard metal roll core.

4. The roll of claim 1, wherein the covering layer comprises a matrix material and wherein one of fillers and fibers are embedded in the matrix material.

5. The roll of claim 1, wherein the amount thermosetting plastic is, one of greater than and proportionally greater than, the amount of thermoplastic.

6. The roll of claim 5, wherein the proportion of thermosetting plastic is one of between approximately 50% and 80%.

7. The roll of claim 6, wherein the proportion is between approximately 60% and 75%.

8. The roll of claim 7, wherein the proportion is approximately 70%.

9. The roll of claim 1, wherein the covering layer includes at least two different thermosetting plastics.

10. The roll of claim 9, wherein the covering layer includes at least two different thermoplastics.

11. The roll of claim 1, wherein the covering layer includes at least two different thermoplastics.

12. The roll of claim 1, wherein the covering layer comprises a mixture of the at least one thermosetting plastic and the at least one thermoplastic and wherein an amount of the thermosetting plastic relative to the amount of thermoplastic in the covering layer comprises a mixture ratio which is essentially constant over an axial length of the covering layer.

13. The roll of claim 1, wherein the covering layer comprises a mixture of the at least one thermosetting plastic and the at least one thermoplastic and wherein an amount of the thermosetting plastic relative to the amount of thermoplastic in the mixture comprises a mixture ratio which is essentially constant over a radial thickness of the covering layer.

14. The roll of claim 1, wherein the covering layer comprises a mixture of the at least one thermosetting plastic and the at least one thermoplastic and wherein an amount of the thermosetting plastic relative to the amount of thermoplastic in the mixture comprises a mixture ratio which varies over a radial thickness of the covering layer.

15. The roll of claim 14, wherein the amount or proportion of thermoplastic relative to the amount of the thermosetting plastic increases radially outwardly in the covering layer.

16. The roll of claim 1, wherein the covering layer includes one of fillers and fibers.

17. The roll of claim 16, wherein the covering layer comprises a matrix material and wherein the fillers or fibers are disposed in the matrix material of the covering layer.

18. The roll of claim 1, wherein the covering layer includes fibers arranged in the form of one or more fiber layers.

19. The roll of claim 1, wherein the covering layer includes one of glass, carbon, and aramide fibers.

20. The roll of claim 1, wherein the covering layer includes fibers and fillers.

21. The roll of claim 20, wherein the fibers and fillers are encapsulated by the covering layer made of matrix material.

22. The roll of claim 1, wherein the covering layer includes powdered fillers.

23. A process for making the roll of claim 1, the process comprising:
    forming the covering layer with the at least one thermosetting plastic and the at least one thermoplastic; and
    applying the covering layer to the outer surface of the roll core.

24. The process of claim 23, wherein the forming comprises mixing the at least one thermosetting plastic and at least one thermoplastic to form an elastic matrix material.

25. The process of claim 23, wherein the covering layer comprises one of fibers and fillers.

26. The process of claim 23, wherein the covering layer comprises fibers which are arranged in the form of one of fiber bundles, fiber rovings, and fiber fleeces.

27. The process of claim 23, wherein the forming comprises:
    mixing the at least one thermosetting plastic and the at least one thermoplastic to form an elastic matrix material; and
    placing fibers one of into and adjacent to the elastic matrix material.

28. The process of claim 23, wherein the forming comprises mixing the at least one thermosetting plastic and the at least one thermoplastic to form an elastic matrix material and wherein the applying comprises drawing fibers through a matrix bath comprising the elastic matrix material and winding the fibers.

29. The process of claim 28, wherein the covering layer is formed with the fibers being wound onto a tool and thereafter the covering layer is applied to the roll core.

30. The process of claim 28, wherein the covering layer is formed with the fibers being wound onto the roll core.

31. The process of claim 23, wherein the forming comprises mixing the at least one thermosetting plastic and the at least one thermoplastic to form an elastic matrix material and wherein the applying comprises winding fibers in a substantially dry state and thereafter coating the fibers with the elastic matrix material.

32. The process of claim 31, wherein the covering layer is formed with the fibers being wound onto a tool and thereafter the covering layer is applied to the roll core.

33. The process of claim 31, wherein the covering layer is formed with the fibers being wound onto the roll core.

34. The process of claim 31, wherein the wound fibers comprise one of fiber bundles, fiber rovings, and fiber fleeces.

35. The process of claim 31, wherein the coating completely encapsulates the fibers.

36. The process of claim 31, wherein the coating occurs one of during and after the fibers are wound.

37. The process of claim 23, wherein the at least one thermosetting plastic and the at least one thermoplastic are mixed together by one of a physical and a mechanical mixing procedure.

38. The process of claim 23, wherein the at least one thermosetting plastic and the at least one thermoplastic are mixed together by one of a chemical mixing process and a copolymerization.

39. A process of repairing the roll of claim 1, the process comprising:
    heating the covering layer made from an elastic matrix material which comprises the at least one thermosetting plastic and the at least one thermoplastic; and
    filling any markings in the outer surface of the covering layer.

40. The process of claim 39, wherein the filling comprises filling the markings with a material which is comparable to the matrix material.

41. The process of claim 39, wherein the filling comprises allowing the markings to be filled with heated matrix material from the covering layer.

42. The process of claim 39, further comprising rotating the elastic covering layer one of during and after the heating.

43. The process of claim 39, further comprising removing the covering layer from a roll core prior to heating and thereafter placing the covering layer onto the role core.

44. The process of claim 39, wherein the heating comprises heating the covering layer while it remains installed on a roll core.

45. The process of claim 39, further comprising one of smoothing and polishing a surface of the covering layer one of during or after the heating.

46. The roll of claim 1, wherein the outer surface of the covering layer is easily repairable by heating.

47. A process of repairing the roll of claim 1, the process comprising:
    heating the covering layer to eliminate markings in the outer surface of the covering layer.

48. A roll for smoothing a web comprising:
    a roll core having an outer surface;
    a covering layer disposed on the outer surface of the roll core, the covering layer having an inner surface and an outer surface;
    the covering layer comprising an elastic matrix material;
    the elastic matrix material comprising a mixture of at least one thermosetting plastic and at least one thermoplastic; and
    the covering layer including one of fibers and fillers,
    wherein the at least one thermoplastic has a melting temperature which is below a glass transition temperature of the at least one thermosetting plastic,
    wherein the covering layer contains no through-apertures and has a smooth outer surface, and
    wherein the roll is a smoothing paper web roll.

49. A process for making the roll of claim 48, the process comprising:
    forming the covering layer by mixing the at least one thermosetting plastic and the at least one thermoplastic to form an elastic matrix material;
    placing fibers one of into and adjacent to the elastic matrix material; and
    applying the covering layer to the outer surface of the roll core.

50. A process of repairing the roll of claim 48, the process comprising:
    heating the covering layer made from an elastic matrix material which comprises the at least one thermosetting plastic and the at least one thermoplastic, the at least one thermoplastic having a melting temperature which is below a glass transition temperature of the at least one thermosetting plastic,
    wherein the covering layer is heated above the melting temperature of the at least one thermoplastic and below the glass transition temperature of the at least one thermosetting plastic.

51. The process of claim 50, further comprising rotating the covering layer one of during and after the heating.

52. The process of claim 50, further comprising smoothing or polishing a surface of the covering layer one of during and after the heating.

53. The roll of claim 48, wherein the outer surface of the covering layer is easily repairable by heating.

54. A process of repairing the roll of claim 48, the process comprising:
    heating the covering layer to eliminate markings in the outer surface of the covering layer.

55. A roll for smoothing a web comprising:
    a roll core having an outer surface;
    a covering layer disposed on the outer surface of the roll core, the covering layer having an inner surface and an outer surface;
    the covering layer comprising at least one thermosetting plastic and at least one thermoplastic,
    wherein the at least one thermoplastic has a melting temperature which is below a glass transition temperature of the at least one thermosetting plastic; and
    wherein the covering layer contains no through-apertures and has a smooth outer surface.

56. The roll of claim 55, wherein the roll is a smoothing paper web roll.

57. The roll of claim 56, wherein the covering layer is a solid cylindrical mass.

58. The roll of claim 55, wherein the outer surface of the covering layer is easily repairable by heating.

59. A process of repairing the roll of claim 55, the process comprising:
    heating the covering layer to eliminate markings in the outer surface of the covering layer.

* * * * *